(12) United States Patent
Kitajima et al.

(10) Patent No.: US 10,702,808 B2
(45) Date of Patent: Jul. 7, 2020

(54) FILTER DEVICE AND FILTRATION DEVICE

(71) Applicant: YAMASHIN-FILTER CORP., Kanagawa (JP)

(72) Inventors: Nobuyuki Kitajima, Kanagawa (JP); Mitsunobu Okamoto, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 0 days.

(21) Appl. No.: 16/460,750

(22) Filed: Jul. 2, 2019

(65) Prior Publication Data

US 2019/0321758 A1  Oct. 24, 2019

Related U.S. Application Data

(63) Continuation of application No. PCT/JP2018/003798, filed on Feb. 5, 2018.

(30) Foreign Application Priority Data

Feb. 13, 2017  (JP) ................................. 2017-024479

(51) Int. Cl.
    *B01D 29/11*  (2006.01)
    *B01D 29/15*  (2006.01)
    (Continued)

(52) U.S. Cl.
    CPC ............. *B01D 29/58* (2013.01); *B01D 29/15* (2013.01); *B01D 29/21* (2013.01); *B01D 29/23* (2013.01);
    (Continued)

(58) Field of Classification Search
    CPC .. B01D 29/58; B01D 35/027; B01D 35/0276; B01D 29/925; B01D 36/00;
    (Continued)

(56) References Cited

U.S. PATENT DOCUMENTS 4,133,763 A * 1/1979 Cooper ................. B01D 29/21
                                                                210/232
2002/0134726 A1   9/2002 Ardes
(Continued)

FOREIGN PATENT DOCUMENTS

JP   H4-137711 U    12/1992
JP   2008-290004 A  12/2008
(Continued)

OTHER PUBLICATIONS

European Search Opinion for EP-18750647.2 dated Jan. 27, 2020, pp. 1-3 (Year: 2020).*

(Continued)

*Primary Examiner* — Lucas A Stelling
*Assistant Examiner* — Angel Olivera
(74) *Attorney, Agent, or Firm* — Nakanishi IP Associates, LLC

(57) ABSTRACT

A filter element having a substantially cylindrical shape is provided inside a filter case that is provided with a plurality of opening portions in a side surface and has a bottomed substantially cylindrical shape. A fluid flows into a hollow portion of the filter element from an inflow portion provided between a bottom surface of the filter case and the filter element in a height direction. Further, an inner tube provided inside a filtration material having a substantially cylindrical shape includes a first region that is formed with an opening portion substantially on the entire surface and a second region that is not formed with an opening portion. The second region is provided below the first region to include a lower end of the inner tube.

4 Claims, 3 Drawing Sheets

(51) Int. Cl.
  *B01D 29/23* (2006.01)
  *B01D 29/33* (2006.01)
  *B01D 29/92* (2006.01)
  *B01D 35/027* (2006.01)
  *B01D 36/00* (2006.01)
  *F15B 21/04* (2019.01)
  *F15B 21/041* (2019.01)
  *B01D 35/00* (2006.01)
  *B01D 29/21* (2006.01)
  *B01D 29/58* (2006.01)
  *F15B 1/26* (2006.01)
  *F01M 1/10* (2006.01)
  *B01D 29/07* (2006.01)
  *B01D 35/147* (2006.01)
  *B01D 35/153* (2006.01)
  *F15B 21/044* (2019.01)

(52) U.S. Cl.
  CPC ........... *B01D 29/232* (2013.01); *B01D 29/33* (2013.01); *B01D 29/925* (2013.01); *B01D 35/027* (2013.01); *B01D 35/0276* (2013.01); *B01D 36/00* (2013.01); *B01D 36/001* (2013.01); *F01M 1/10* (2013.01); *F15B 1/26* (2013.01); *F15B 21/04* (2013.01); *F15B 21/041* (2013.01); *B01D 29/07* (2013.01); *B01D 29/114* (2013.01); *B01D 29/117* (2013.01); *B01D 35/005* (2013.01); *B01D 35/147* (2013.01); *B01D 35/153* (2013.01); *B01D 2201/0415* (2013.01); *B01D 2201/301* (2013.01); *F15B 21/044* (2013.01)

(58) Field of Classification Search
  CPC .... B01D 29/232; B01D 29/21; B01D 35/153; B01D 29/117; B01D 29/114; B01D 2201/0415; B01D 29/07; B01D 2201/301; B01D 29/15; B01D 36/001; B01D 29/33; B01D 29/23; B01D 35/147; B01D 19/0057; B01D 35/005; F15B 21/04; F15B 21/041; F15B 1/26; F15B 21/044; B04C 2003/006; B04C 2009/002; B04C 3/06; F01M 1/10; F16N 39/002
  See application file for complete search history.

(56) References Cited

U.S. PATENT DOCUMENTS

| | | |
|---|---|---|
| 2003/0098269 A1 | 5/2003 | Ardes |
| 2003/0226793 A1* | 12/2003 | Merritt ............... B01D 29/15 |
| | | 210/206 |
| 2008/0197060 A1 | 8/2008 | Girondi |
| 2014/0231366 A1 | 8/2014 | Ries et al. |
| 2018/0104629 A1 | 4/2018 | Taku et al. |

FOREIGN PATENT DOCUMENTS

| | | | |
|---|---|---|---|
| JP | 4989832 B2 | | 8/2012 |
| JP | 2016064336 A | * | 4/2016 |
| WO | 2016/204118 A1 | | 12/2016 |

OTHER PUBLICATIONS

International Search Report issued in PCT/JP2018/003798 dated Apr. 17, 2018 with English Translation (7 pages).
European Search Report issued in European Patent Application No. 18750647.2, dated Jan. 27, 2020 (4 pages).

* cited by examiner

FILTER DEVICE AND FILTRATION DEVICE

CROSS-REFERENCE TO RELATED APPLICATIONS

This application is a continuation application of International Patent Application No. PCT/JP2018/003798 filed on Feb. 5, 2018, which claims priority to Japanese Patent Application No. 2017-024479 filed on Feb. 13, 2017, the entire contents of which are incorporated by reference.

TECHNICAL FIELD

The present invention relates to a filter device and a filtration device.

BACKGROUND ART

Patent Document 1 discloses a filtration device including a first filtration unit that includes a cylindrical filtration material and filtrates liquid to be filtrated by passing the liquid to be filtrated from the inside to the outside, and a second filtration unit that further filtrates the liquid that has passed through the first filtration unit. In the filtration device, the first filtration unit and the second filtration unit are disposed in a tank in posture to overlap each other in a state the second filtration unit abutting one end of the first filtration unit. This makes it possible to reduce the size of the tank and improve a degree of freedom of the design, and to simplify a structure of the tank.

CITATION LIST

Patent Document

Patent Document 1: JP 2008-290004 A

However, in the invention described in Patent Document 1, liquid flows from a position higher than a liquid surface to the first filtration unit, and thus there is a risk that the incoming liquid may cause liquid stored inside the first filtration unit to foam. Further, in the invention described in Patent Document 1, there is a risk that foam included in the stored liquid may flow into the second filtration unit together with the liquid.

When air passes through the filtration device together with the liquid, there is a risk that a malfunction may occur in a pump due to suction of air by the pump, or damage and the like may occur in a component due to temporarily extremely high temperature and pressure of hydraulic oil caused by air bubbles being ruptured and the like in a hydraulic circuit.

Further, in the invention described in Patent Document 1, there is a risk that dust trapped by the filtration may fall into the tank when a filter element is replaced.

SUMMARY OF INVENTION

One or more embodiments of the present invention are directed to a filter device and a filtration device capable of preventing air bubbles from flowing out of a tank together with liquid during filtration, and preventing dust and the like trapped by the filtration from falling into the tank when a filter element is replaced.

A filter device according to one or more embodiments of the present invention is a filter device that includes, for example, a first filtration unit provided to protrude from an upper surface of a tank toward the inside of the tank, and a second filtration unit provided below the first filtration unit to overlap the first filtration unit in a plan view and having a substantially cylindrical shape. The first filtration unit includes a filter case that is provided with a plurality of opening portions in a side surface and has a bottomed substantially cylindrical shape, a lid member that covers an opening end of an upper portion of the filter case, a filter element that is provided inside the filter case and has a substantially cylindrical shape, and an inflow portion that is configured to allow a fluid to flow into a hollow portion of the filter element and is provided between a bottom surface of the filter case and the filter element in a height direction. The lid member is detachably provided on the filter case. The filter element is detachably provided on the filter case via the opening end. The filter element includes a filtration material that has a substantially cylindrical shape, and an inner tube that has substantially the same height as that of the filtration material, is provided inside the filtration material, and has a substantially cylindrical shape. The inner tube includes a first region that is formed with an opening portion substantially on the entire surface and a second region that is not formed with the opening portion. The second region is provided below the first region to include a lower end of the inner tube.

According to the filter device according to one or more embodiments of the present invention, the filter element having the substantially cylindrical shape is provided inside the filter case that is provided with the plurality of opening portions in the side surface and has the bottomed substantially cylindrical shape. The fluid flows into the hollow portion of the filter element from the inflow portion provided between the bottom surface of the filter case and the filter element in the height direction. In this way, air bubbles can be prevented from flowing out of the tank together with liquid. Further, the inner tube provided inside the filtration material having the substantially cylindrical shape includes the first region that is formed with the opening portion substantially on the entire surface and the second region that is not formed with the opening portion. The second region is provided below the first region to include the lower end of the inner tube. In this way, when the filter element is replaced, dust and the like trapped between the inner tube and the filtration material can be prevented from falling into the tank.

Here, the second region may be substantially greater than or equal to ¼ of the entire height of the inner tube. In this way, the dust can be reliably trapped between the inner tube and the filtration material.

A filtration device according to one or more embodiments of the present invention includes, for example, a tank, and a filter device including a first filtration unit provided to protrude from an upper surface of the tank toward the inside of the tank, and a second filtration unit provided below the first filtration unit to overlap the first filtration unit in a plan view and having a substantially cylindrical shape. The first filtration unit includes a filter case that is provided with a plurality of opening portions in a side surface and has a bottomed substantially cylindrical shape, a lid member that covers an opening end of an upper portion of the filter case, a filter element that is provided inside the filter case and has a substantially cylindrical shape, and an inflow portion that is configured to allow a fluid to flow into a hollow portion of the filter element and is provided between a bottom surface of the filter case and the filter element in a height direction. The lid member is detachably provided on the filter case. The filter element is detachably provided on the filter case via the opening end. The filter element includes a filtration material that has a substantially cylindrical shape, and an inner tube that has substantially the same height as that of the filtration material, is provided inside the filtration material, and has a substantially cylindrical shape. The inner tube includes a first region that is formed with an opening portion (e.g., openings) substantially on the entire surface and a second region that is not formed with the opening portion. The second region is provided below the first region to include a lower end of the inner tube. In this way, air bubbles can be prevented from flowing out of a tank together with liquid during filtration, and dust and the like trapped by the filtration can be prevented from falling into the tank when a filter element is replaced.

According to one or more embodiments of the present invention, air bubbles can be prevented from flowing out of the tank together with liquid during filtration, and dust and the like trapped by the filtration can be prevented from falling into the tank when the filter element is replaced.

DESCRIPTION OF EMBODIMENTS

Below, detailed description of embodiments of the present invention will be given with reference to drawings. Hereinafter, hydraulic oil is described as an example of a fluid, but the present invention is applicable to various fluids other than the hydraulic oil.

Figure 1:
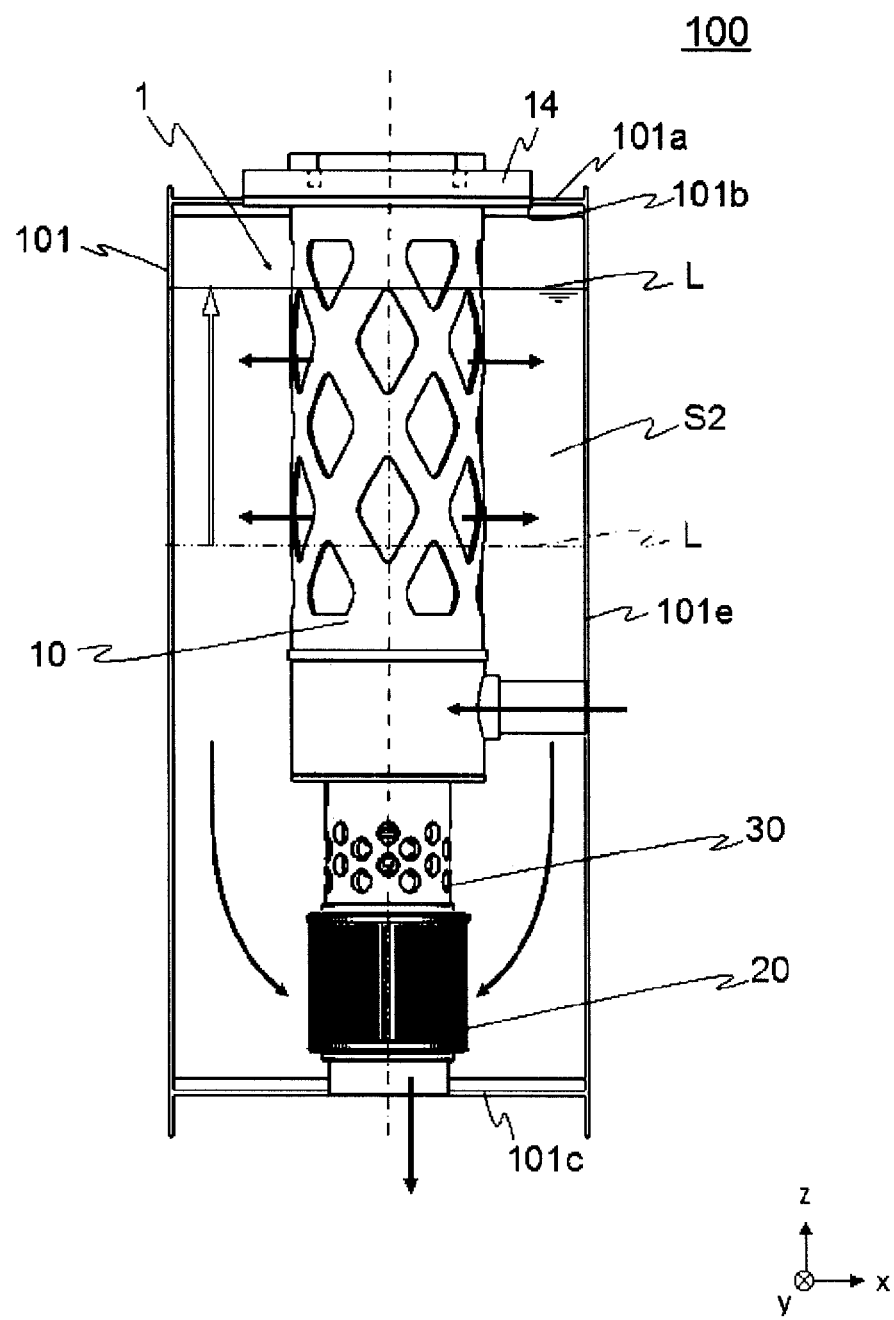
FIG. 1 is a diagram illustrating an overview of a hydraulic oil tank 100 provided, inside the hydraulic oil tank 100, with a filter device 1 according to an embodiment of the present invention.

FIG. 1 is a diagram illustrating an overview of a hydraulic oil tank 100 provided, inside the hydraulic oil tank 100, with a filter device 1 according to an embodiment of the present invention. In FIG. 1, main parts of the hydraulic oil tank 100 are illustrated in a perspective view, and some parts are illustrated in a cross-sectional view (however, hatching indicating a cross section is omitted).

The hydraulic oil tank 100 is installed in a work machine (a hydraulic device, for example, not illustrated), and is provided inside a hydraulic circuit of hydraulic oil supplied to the hydraulic device and is configured to store the hydraulic oil. In the hydraulic circuit, the hydraulic oil passes through the hydraulic device and is introduced into the hydraulic oil tank 100.

The hydraulic oil tank 100 includes a tank main body 101 having a box shape, for example, and this tank main body 101 has a cavity inside. The tank main body 101 primarily includes the filter device 1 therein.

A hole 101b into which the filter device 1 is inserted is formed in an upper surface 101a of the tank main body 101. The filter device 1 is fixed to the tank main body 101 by providing a lid member 14 and the like (described later in detail) of the filter device 1 on an upper surface of the upper surface 101a.

Next, the filter device 1 will be described. The filter device 1 primarily includes a first filtration unit 10, a second filtration unit 20, and a third unit 30. The first filtration unit 10 and the third unit 30 have a bottomed substantially cylindrical shape, and the second filtration unit 20 has a substantially cylindrical shape.

The second filtration unit 20 and the third unit 30 are provided below the first filtration unit 10 to overlap the first filtration unit 10 in a plan view (when viewed from a z-direction). The second filtration unit 20 is provided near a bottom surface 101c of the tank main body 101. The third unit 30 is provided between the first filtration unit 10 and the second filtration unit 20.

The first filtration unit 10, the second filtration unit 20, and the third unit 30 have substantially the same orientation for a central axis. In the present embodiment, the central axes of the first filtration unit 10, the second filtration unit 20, and the third unit 30 substantially match, but these may not substantially match.

Figure 2:
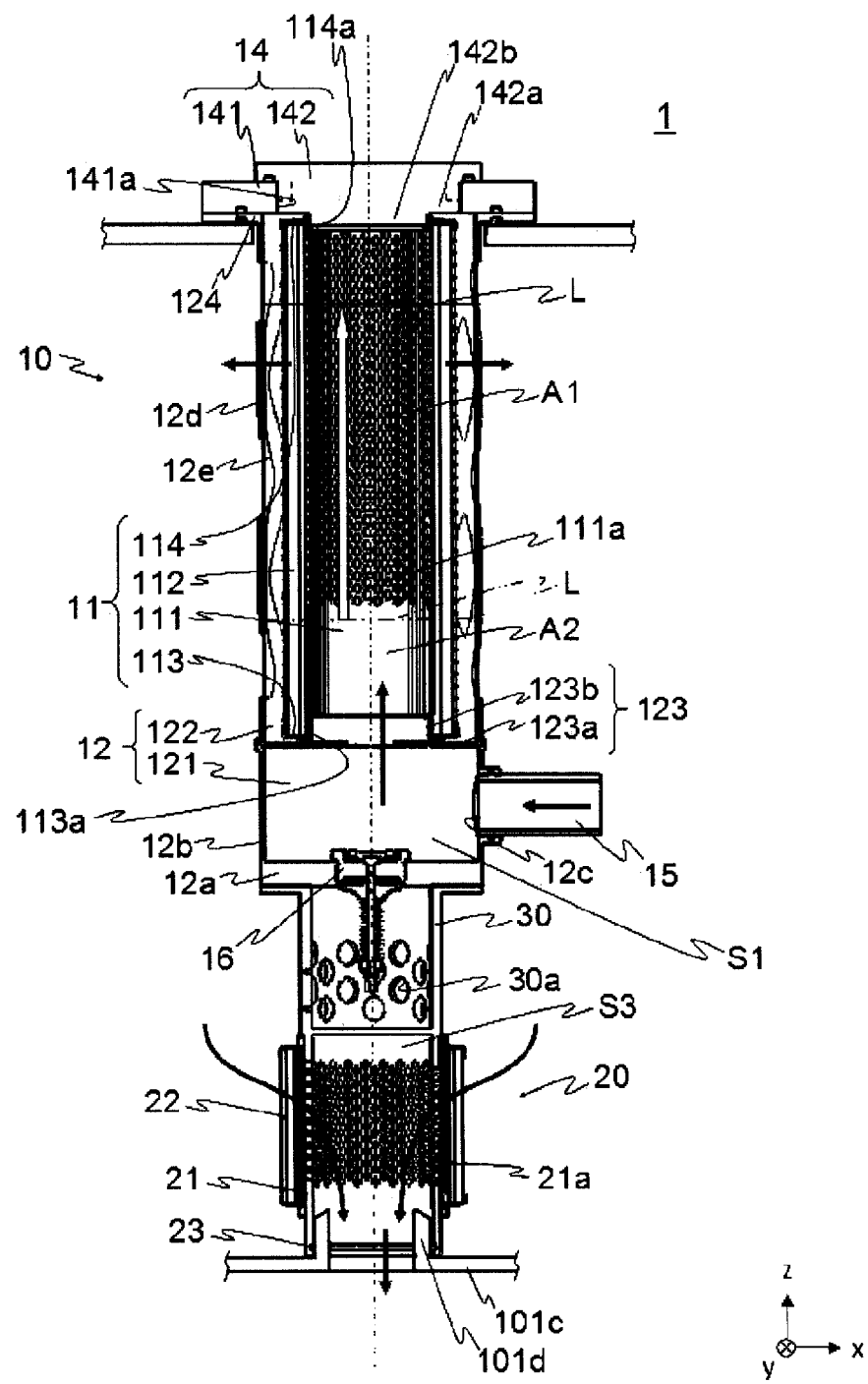
FIG. 2 is a cross-sectional view illustrating an overview of the filter device 1.
Figure 3:
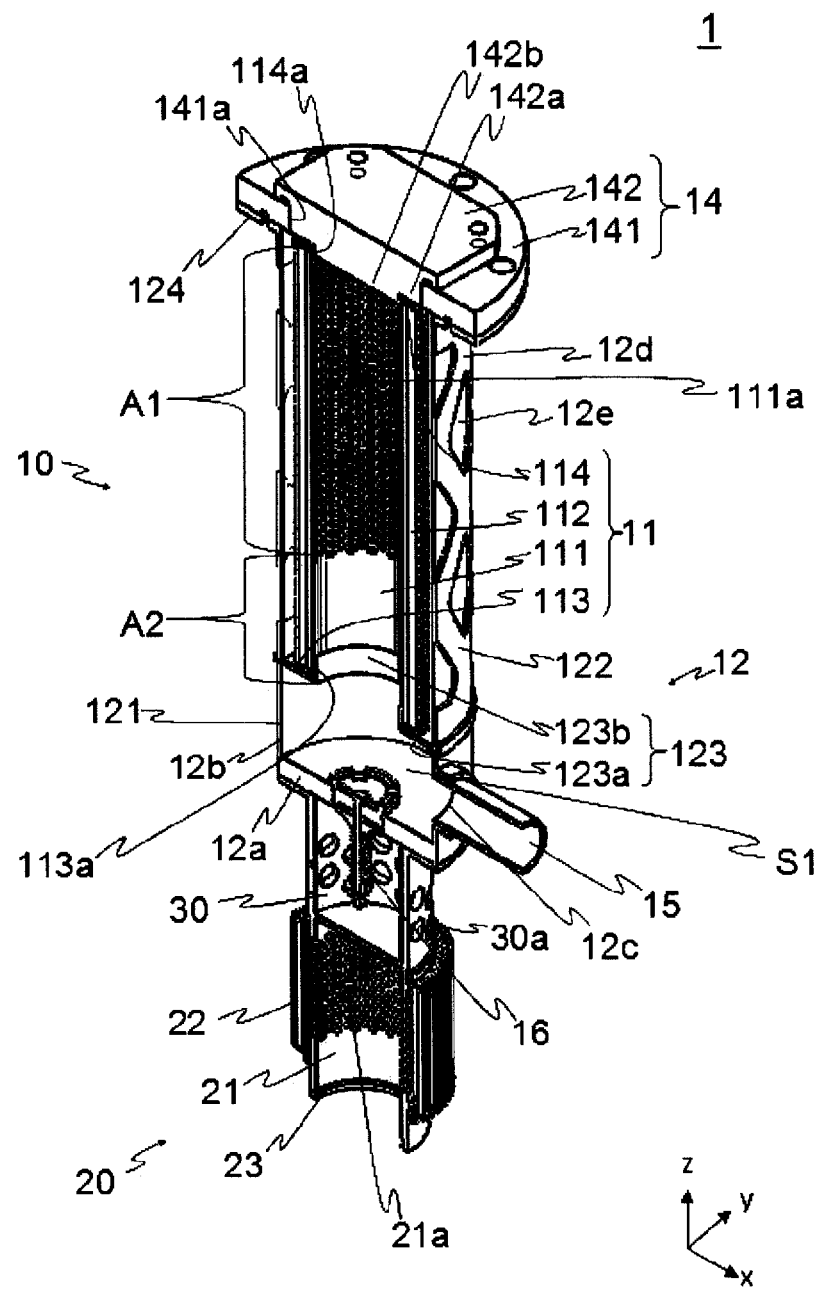
FIG. 3 is a perspective view illustrating an overview of the filter device 1 when cut along a center line.

FIG. 2 is a cross-sectional view illustrating an overview of the filter device 1. FIG. 3 is a perspective view illustrating an overview of the filter device 1, and is a diagram illustrating a state where the filter device 1 is cut along a center line. In FIGS. 2 and 3, hatching indicating a cross section is omitted.

The first filtration unit 10 includes a filter element 11, a filter case 12, a lid member 14, an inflow pipe 15, and a valve 16.

The filter element 11 is a member having a substantially cylindrical shape as a whole and is provided inside the filter case 12. The filter element 11 primarily includes an inner tube 111, a filtration material 112, and plates 113 and 114.

The filtration material 112 is configured to filtrate the hydraulic oil, and has a substantially cylindrical shape with a thickness in a radial direction. The filtration material 112 is formed by pleating a filter paper formed of a synthetic resin, paper, or the like, and connecting both ends of the pleated filter paper to roll into a cylindrical shape.

The inner tube 111 is a substantially cylindrical member made of metal and is provided inside the filtration material 112. The height of the inner tube 111 is substantially the same as the height of the filtration material 112.

The inner tube 111 includes a first region A1 in which an opening portion 111a through which the hydraulic oil passes is formed on substantially the entire surface, and a second region A2 in which the opening portion 111a is not formed. The second region A2 is provided below the first region A1 to include a lower end of the inner tube 111.

In the present embodiment, the second region A2 is substantially ¼ of the entire height of the inner tube 111, but the height of the second region A2 is not limited to this. However, in order to prevent dust and the like from leaking out, the second region A2 is preferably substantially greater than or equal to ¼ of the entire height of the inner tube 111. Further, the second region A2 is preferably less than or equal to ⅓ to half of the height of the first region A1 not to impede a flow of the hydraulic oil.

The plate 113 is provided on lower ends and the plate 114 is provided on upper ends of the inner tube 111 and the filtration material 112. The plate 113 and the plate 114 are members having a substantially circular plate shape or a bottomed substantially cylindrical shape, and are formed by using a resin or a metal. The plate 113 and the plate 114 respectively have opening portions 113a and 114a formed substantially at the center.

The filter case 12 is a member having a bottomed substantially cylindrical shape as a whole, and is formed of a metal. The filter case 12 primarily includes a first case 121, a second case 122, and mounting members 123 and 124. The second case 122 is integrally formed above the first case 121.

The first case 121 is a bottomed substantially cylindrical member, and the valve 16 is provided on a bottom surface 12a. The valve 16 opens and closes in response to a difference between the pressure inside the first case 121 (space S1) and the pressure inside the tank main body 101 (space S2, see FIG. 1).

An opening 12c in which the inflow pipe 15 is provided is formed in a side surface 12b of the first case 121. The inflow pipe 15 is provided between the bottom surface 12a and the filter element 11 in a height direction (z-direction). The inflow pipe 15 penetrates a side surface 101e of the tank main body 101 (see FIG. 1), and communicates with the inside of the filter case 12 and the outside of the tank main body 101. The hydraulic oil flowing in from the inflow pipe 15 passes through the inside of the first case 121 and is guided into a hollow portion of the filter element 11, in the space S1.

The second case 122 is a substantially cylindrical member with the filter element 11 provided therein.

A plurality of holes 12e are formed in a side surface 12d of the second case 122. A wire mesh (not illustrated) formed by weaving a metal wire rod is provided in the hole 12e. The hydraulic oil that has passed through the filtration material 112 passes through gaps of the wire mesh in the hole 12e. The gaps of the wire mesh in the hole 12e correspond to a plurality of opening portions.

The mounting member 123 is provided on a lower end surface of the second case 122. The mounting member 123 includes a bottom surface portion 123a having a substantially disk shape, and a cylindrical portion 123b that protrudes upward along an inner peripheral surface of the bottom surface portion 123a. The filter element 11 (here, a lower surface of the plate 113) is placed on the bottom surface portion 123a. The cylindrical portion 123b is inserted into the opening portion 113a. In this way, the inside of the first case 121 and the hollow portion of the filter element 11 communicate with each other.

The mounting member 124 is provided near an upper end of the side surface 12d. The lid member 14 is mounted on the upper surface 101a via the mounting member 124. Note that the mounting member 124 is not necessarily required.

The lid member 14 is a substantially plate-like member that covers an opening end of an upper portion of the filter case 12. The lid member 14 is detachably provided on the filter case 12.

The lid member 14 includes a first lid 141 and a second lid 142. The first lid 141 has a substantially disk shape, and includes a hollow portion 141a formed substantially at the center. Protruding portions 142a and 142b that have a substantially columnar shape and protrude downward are formed substantially at the center of the second lid 142. The protruding portion 142a is inserted into the hollow portion 141a. The protruding portion 142b is inserted into the opening portion 114a.

When the lid member 14 (here, the second lid 142) is removed from the filter case 12, the filter element 11 can be withdrawn from the opening end of the upper portion of the filter case 12. When the lid member 14 is mounted on the filter case 12, the filter element 11 is provided inside the second case 122 by being sandwiched by the second lid 142 and the mounting member 123.

Note that, in the present embodiment, the lid member 14 includes the first lid 141 having substantially a disk shape and the second lid 142, but a manner of the lid member 14 is not limited to this. For example, the lid member 14 may be one component.

The second filtration unit 20 is, for example, a suction strainer for preventing an entry of foreign substances into the hydraulic pump. The second filtration unit 20 primarily includes a main body portion 21 having a substantially cylindrical shape made of metal, and a filtration material 22 provided outside the main body portion 21.

The main body portion 21 is a substantially cylindrical member made of metal, and a plurality of holes 21a are formed in a side surface. The filtration material 22 is formed by pleating a wire mesh formed by weaving a metal wire rod, and connecting both ends of the pleated wire mesh to roll into a cylindrical shape.

An outflow portion 101d is formed on the bottom surface 101c of the tank main body 101 (see FIG. 2). The outflow portion 101d is formed to protrude from the bottom surface 101c into the tank main body 101 and is inserted into the main body portion 21. A sealing member 23 (for example, an O-ring) is provided between the outflow portion 101d and the main body portion 21 such that liquid filtrated by the second filtration unit 20 does not leak into the tank main body 101.

Note that, in the present embodiment, the outflow portion 101d inserted into the main body portion 21 is formed on the bottom surface 101c, but a position of the outflow portion 101d is not limited to this. For example, a substantially L-shaped outflow portion may be formed near a lower end portion of the side surface 101e, and a tip thereof may be inserted into the main body portion 21.

The third unit 30 is a bottomed substantially cylindrical member made of metal, and is provided below the bottom surface 12a of the first case 121. The third unit 30 connects the first filtration unit 10 and the second filtration unit 20. In the present embodiment, the third unit 30 and the main body portion 21 are integrally formed, but the third unit 30 and the main body portion 21 may be separate components.

A plurality of holes 30a through which the hydraulic oil passes are formed in a side surface of the third unit 30. As the valve 16 opens, fluid existing in the space S1 flows into the space inside the third unit 30, then passes through the holes 30a, and flows into the space S2.

Next, a function of the filter device 1 configured as described above will be described with reference to FIGS. 1 and 2. The arrows in FIGS. 1 and 2 indicate the flow of the hydraulic oil.

The hydraulic oil flows through the hydraulic circuit during operation of the hydraulic device. As illustrated in FIG. 2, the hydraulic oil flows into the space S1 via the inflow pipe 15 and the opening 12c. The hydraulic oil is filtrated by flowing from the inside to the outside of the filter element 11. The hydraulic oil after the filtration flows out of the plurality of opening portions formed in the side surface 12d (here, the gaps of the wire mesh provided in the hole 12e) into the space S2 (see FIG. 1). In this way, the hydraulic oil is filtrated by the first filtration unit 10 and is stored in the hydraulic oil tank 100.

In the present embodiment, as illustrated in FIG. 1, the inflow pipe 15 is provided between the bottom surface 12a of the filter case 12 and the filter element 11 in the height direction. Therefore, a position of the inflow pipe 15 is lower than an oil surface L, and the oil surface L rises due to the inflow of the hydraulic oil from the inflow pipe 15 (see a chain double-dashed line and a white arrow in FIG. 1).

As illustrated in FIG. 2, the opening portion 111a through which the hydraulic oil passes is formed only in the first region A1. Therefore, no hydraulic oil passes through the filtration material 112 and the hole 12e unless the oil surface L is higher than the lower side of the first region A1. Thus, at a stage when the oil surface L rises, a position (outflow position) in the height direction in which the hydraulic oil flows out through the hole 12e is in the vicinity of the oil surface L.

Since the wire mesh is provided in the hole 12e, the hydraulic oil can pass through the hole 12e, but air bubbles can hardly pass therethrough, and particularly, large air bubbles cannot pass through the hole 12e. Therefore, air bubbles included in the hydraulic oil rise to the oil surface L on the inside of the side surface 12d, and then disappear. Even if air bubbles are mixed in the hydraulic oil flowing out of the hole 12e, the air bubbles immediately rise to the oil surface L and disappear because the outflow position is in the vicinity of the oil surface L. In this way, air (air bubbles) hardly flows into the vicinity of the bottom surface 101c of the tank main body 101.

When the oil surface L is low, air is included in the hollow portion of the filter element 11. This initial air is discharged from the space S1 to the space S2 via the holes 12e as the oil surface L rises. Therefore, the initial air does not mix with the liquid after filtration.

The hydraulic oil stored in the space S2 (in the hydraulic oil tank 100) is filtrated by the second filtration unit 20 and flows out of the outflow portion 101d. In this way, the hydraulic oil after filtration is supplied again to the hydraulic device.

When the filtration is repeated, clogging of the filtration material 112 occurs, and thus the filter element 11 is replaced. The lid member 14 is removed from the filter case 12, and then the filter element 11 is withdrawn upward. As a result, the filter element 11 is withdrawn from the opening end of the upper portion of the filter case 12.

Since the inner tube 111 includes the second region A2 in which the opening portion 111a is not formed, dust and residual oil removed by the filtration material 112 accumulates between the inner tube 111 (second region A2) and the filtration material 112 and does not leak out of the filter element 11. Therefore, when the filter element 11 is replaced, the dust and the residual oil accumulated between the inner tube 111 and the filtration material 112 can be prevented from dripping into the second case 122.

Subsequently, a new filter element 11 after replacement is inserted from the opening end of the upper portion of the filter case 12, and the lid member 14 is mounted on the filter case 12, and then the new filter element 11 is provided inside the second case 122.

According to the present embodiment, the second filtration unit 20 and the third unit 30 are provided below the first filtration unit 10 to overlap the first filtration unit 10 in a plan view, and thus the tank main body 101 can be reduced in size. Further, the inflow pipe 15 is provided between the bottom surface 12a of the filter case 12 and the filter element 11 in the height direction, and thus air bubbles are released in the vicinity of the oil surface L. In this way, the air bubbles can be prevented from flowing out of the hydraulic oil tank 100 together with the hydraulic oil.

Further, according to the present embodiment, the opening portion 111a is not formed below the inner tube (second region A2), and thus, when the filter element 11 is replaced, the dust and the residual oil accumulated between the inner tube 111 and the filter medium 112 can be prevented from dripping into the second case 122.

Note that, in the present embodiment, the plurality of holes 12e are formed in the side surface 12d, and the wire mesh (not illustrated) is provided inside the hole 12e, and thus the plurality of opening portions are formed in the side surface of the second case 122. However, a manner of the plurality of opening portions is not limited to this. For example, the plurality of opening portions may be formed in the side surface of the second case 122 by forming the entire side surface 12d with a wire mesh.

Further, in the present embodiment, the second filtration unit 20 and the third unit 30 are provided below the first filtration unit 10, but the second filtration unit 20 and the third unit 30 are not necessarily required. However, in order to reduce the size of the tank 101 and to make it difficult for air bubbles to flow into the second filtration unit 20, the second filtration unit 20 is preferably provided below the first filtration unit 10.

Embodiments of the invention have been described in detail with reference to the drawings. However, specific configurations are not limited to the embodiments, and changes in the design or the like are also included within a scope which does not depart from the gist of the invention. For example, the above examples have been explained in detail in order to facilitate understanding of the present invention and are not necessarily limited to examples provided with the entirety of the configuration described above. In addition, the configuration of an embodiment may be partially replaced with the configuration of a different embodiment, or the configuration of the different embodiment may be added to, deleted from, or replaced with the configuration of the embodiment.

Further, the term "substantially" in the present invention is not to be understood as merely being strictly the same, and is a concept that includes variations and modifications to an extent that does not result in loss in identity. For example, the term "substantially orthogonal" is not limited to being strictly orthogonal, and is a concept that includes errors of several degrees, for example. Further, simple expressions such as orthogonal, parallel, and identical are not to be understood as merely being strictly orthogonal, parallel, identical, and the like, and include being substantially parallel, substantially orthogonal, substantially identical, and the like.

Furthermore, the meaning of the term "vicinity" in the present invention includes a range of regions (which can be determined as desired) near a position serving as a reference. For example, the term "a vicinity of an end" refers to a range of regions near the end, and is a concept indicating that the end may or may not be included.

REFERENCE SIGNS LIST

1 Filter device
10 First filtration unit
11 Filter element
12 Filter case
12a Bottom surface
12b Side surface
12c Opening
12d Side surface
12e Hole
13 Mounting member
14 Lid member
15 Inflow pipe
16 Valve
20 Second filtration unit
21 Main body portion
21a Hole
22 Filtration material
23 Sealing member
30 Third unit
30a Hole
100 Hydraulic oil tank 101 Tank main body
101a Upper surface
101b Hole
101c Bottom surface
101d Outflow portion
101e Side surface
111 Inner tube
111a: Opening portion
112 Filtration material
113, 114 Plate
113a, 114a Opening portion
121 First case
122 Second case
123 Mounting member
123a Bottom surface portion
123b Cylindrical portion
124 Mounting member
141 First lid
141a Hollow portion
142 Second lid
142a, 142b Protruding portion

The invention claimed is:

1. A filter apparatus comprising a filter device and a tank, wherein the filter device comprises:
   a first filtration unit that protrudes from an upper surface of the tank toward the inside of the tank; and
   a second filtration unit provided below the first filtration unit and having a substantially cylindrical shape,
   wherein the first filtration unit includes:
      a filter case that is provided with a plurality of opening portions in a side surface and has a bottomed substantially cylindrical shape;
      a lid member that covers an opening end of an upper portion of the filter case;
      a filter element that is provided inside the filter case and has a substantially cylindrical shape; and
      an inflow portion comprising a through hole at a side wall of the filter case, and
   wherein:
      the through hole is provided between a bottom surface of the filter case and the filter element in a height direction; and
      the lid member is detachably provided on the filter case;
      the filter element is detachably provided on the filter case via the opening end;
      the filter element includes a filtration material that has a substantially cylindrical shape, and an inner tube that has substantially the same height as that of the filtration material, is provided inside the filtration material, and has a substantially cylindrical shape;
      a circumferential side surface of the inner tube includes a first region and a second region;
      openings are formed over the first region such that the fluid is allowed to pass through a side wall of the inner tube, and no openings are formed on the second region;
      and
      the second region is provided below the first region to include a lower end of the inner tube.

2. The filter device according to claim 1, wherein the second region is greater than or equal to ¼ of the entire height of the inner tube.

3. The filter apparatus according to claim 1, wherein the through hole of the inflow portion is disposed at a lower position in a gravitational direction than a bottom of the filter element.

4. The filter apparatus according to claim 1, wherein the openings formed over the first region comprises a mesh.

* * * * *